United States Patent [19]
Reilly et al.

[11] Patent Number: 5,866,265
[45] Date of Patent: Feb. 2, 1999

[54] RUBBER ARTICLE HAVING A SURFACE DESIGN FOR HIGH ABRASION RESISTANCE

[75] Inventors: Patrick John Reilly, Akron; Ram Murthy Krishnan, Munroe Falls; George Samuel Fielding-Russell, Stow, all of Ohio

[73] Assignee: The Goodyear Tire & Rubber Company, Akron, Ohio

[21] Appl. No.: 612,646

[22] Filed: Mar. 8, 1996

[51] Int. Cl.$^6$ ........................................... B32B 5/16
[52] U.S. Cl. ..................... 428/492; 428/35.7; 428/493; 428/515; 428/521; 428/523
[58] Field of Search ..................... 428/492, 493, 428/515, 521, 523, 35.7

[56] References Cited

U.S. PATENT DOCUMENTS

| | | | |
|---|---|---|---|
| 3,736,972 | 6/1973 | Petraschek et al. | 152/354 |
| 4,044,811 | 8/1977 | Dudek et al. | 152/354 |
| 4,336,012 | 6/1982 | Koch et al. | 425/131.1 |
| 4,405,547 | 9/1983 | Koch et al. | 425/131.1 |
| 4,426,344 | 1/1984 | Dinter et al. | 264/171 |
| 5,066,435 | 11/1991 | Lorenz et al. | 264/40.5 |
| 5,094,788 | 3/1992 | Schrenk et al. | 264/171 |
| 5,094,793 | 3/1992 | Schrenk et al. | 264/171 |
| 5,154,934 | 10/1992 | Okamoto | 425/131.1 |
| 5,178,702 | 1/1993 | Frerking, Jr. et al. | 152/510 |
| 5,223,276 | 6/1993 | Djordjevic et al. | 425/131.1 |
| 5,370,915 | 12/1994 | Hirakawa | 428/36.8 |
| 5,405,690 | 4/1995 | Hirakawa | 428/327 |

FOREIGN PATENT DOCUMENTS

| | | |
|---|---|---|
| 2467971 | 1/1971 | Australia . |
| 496202A2 | 1/1992 | European Pat. Off. . |
| 0780245 | 12/1996 | European Pat. Off. . |

*Primary Examiner*—Ana Woodward
*Attorney, Agent, or Firm*—Bruce J Hendricks

[57] ABSTRACT

The present invention relates to a rubber article having a surface construction designed for abrasion resistance wherein the surface comprises a series of rubber layers parallel to each other and in a density of from at least 200 layers per 25.4 millimeters as measured along the surface area of the article and in a direction perpendicular to each layer.

13 Claims, 2 Drawing Sheets

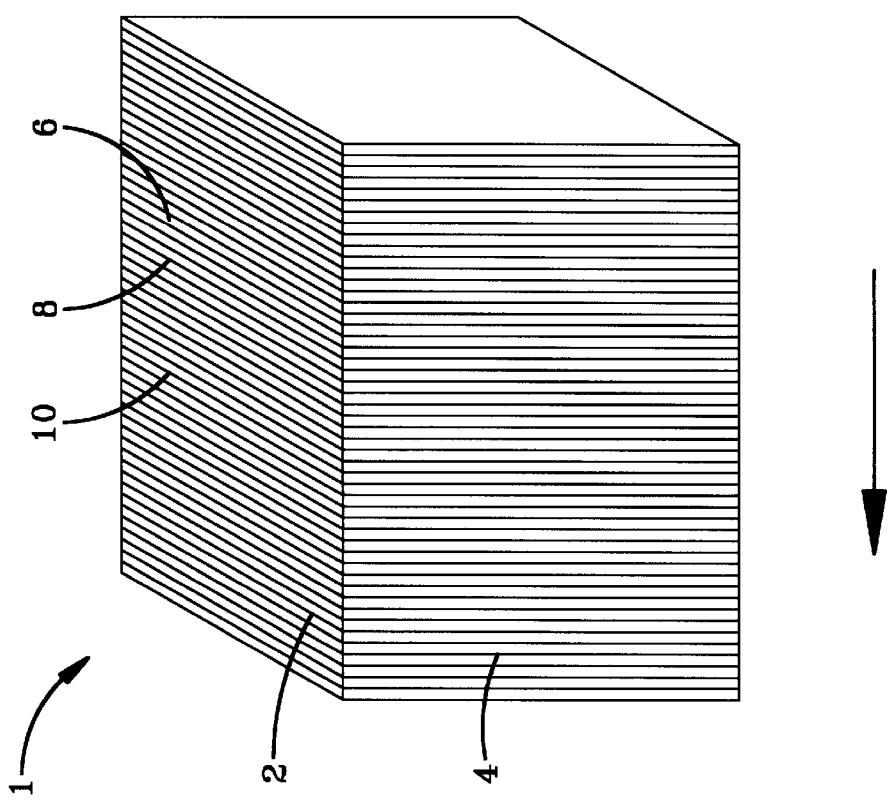

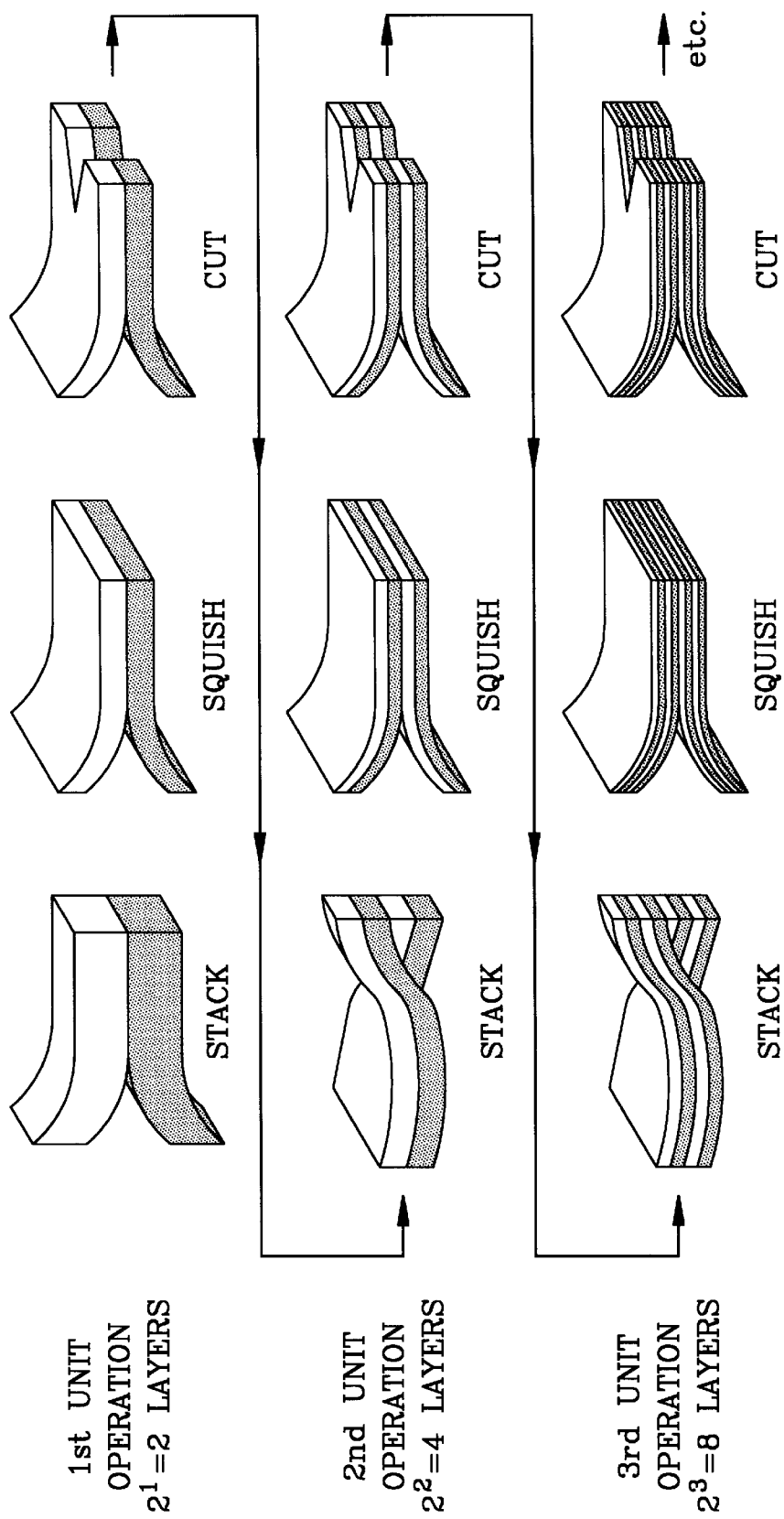

RUBBER ARTICLE HAVING A SURFACE DESIGN FOR HIGH ABRASION RESISTANCE

BACKGROUND OF THE INVENTION

The present invention relates to a rubber article having a surface designed for high abrasion resistance. Many products that are currently produced are designed for high abrasion resistance. Examples of such products include treads for pneumatic tires and shoe soles. Conventionally, the various components of such rubber articles are selectively combined to improve the abrasion resistance. Examples include various rubbers and fillers. Whereas there is an endless search for finding components to improve the abrasion resistance of rubber articles, unexpectedly there has been found a new way to improve the abrasion resistance of a surface of a rubber article using conventional additives.

SUMMARY OF THE INVENTION

The present invention relates to a rubber article having a surface construction designed for abrasion resistance said surface comprising a series of rubber layers parallel to each other and in a density of from at least 200 layers per 25.4 millimeters as measured along said surface of the article and in a direction perpendicular to the layers.

BRIEF DESCRIPTION OF THE DRAWINGS

FIG. 1 schematically illustrates a multilayered article of the present invention.

FIG. 2 is a schematic illustration of a method for making a multilayered article according to the present invention.

DETAILED DESCRIPTION OF THE INVENTION

Referring to FIG. 1, the rubber article 1 of the present invention is characterized by at least one surface 2,4 which is designed for high abrasion resistance. Examples of rubber articles which are designed to have a surface area for high abrasion resistance include a tread of a tire, shoe soles, railroad crossing, tank tread pads, seals, belts and hoses.

The surface area which is designed for the high abrasion resistance comprises a series of rubber layers 6,8,10 which are parallel to each other. The density of the layers 6,8,10 should be at least 200 layers per 25.4 millimeters as measured in a perpendicular direction (shown as an arrow) to the layers 6,8,10 along the surface area of the article. Preferably, the density ranges from about 200 to 20,000 layers per 25.4 millimeters. More preferably, the density ranges from about 5,000 to 15,000 layers per 25.4 millimeters. The rubber layers 6,8,10 may be of the same thickness or the thickness of the layers may be different. Generally speaking, each layer 6,8,10 has a thickness ranging from about 0.001 to about 0.15 millimeters. Preferably, the thickness of each layer 6,8,10 ranges from about 0.0017 to about 0.005 millimeters.

The parallel rubber 6,8,10 layers may be oriented in a variety of directions along the surface of the article. For example, the parallel rubber layers may be oriented to the surface area 2,4 of the article 1 in a direction that is perpendicular to the plane where the abrasion resistance is desired. In accordance with another embodiment, the rubber layers may be oriented to the surface area in a direction that is parallel to the plane at which the abrasion resistance is desired (not shown). Depending on the degree of abrasion resistance, one can orient the parallel layers 6,8,10 at varying degrees to the plane at which the abrasion resistance is expected.

Each rubber layer 6,8,10 is comprised of a rubber compound. Representative rubbers that may be used in the rubber compound include acrylonitrile/diene copolymers, natural rubber, halogenated butyl rubber, butyl rubber, cis-1,4-polyisoprene, styrene-butadiene copolymers, cis-1,4-polybutadiene, styrene-isoprene-butadiene terpolymers and mixtures thereof (please provide any other rubbers which currently contemplate being used). Preferably, the rubber is acrylonitrile-diene copolymers, in particular, acrylonitrile butadiene copolymers. Each rubber layer may be comprised of the same rubber composition or alternating layers may be of different rubber composition.

The rubber compound preferably contains a platy filler. Representative examples of platy fillers include talc, clay, mica and mixture thereof. When used, the amount of platy filler ranges from about 25 to 150 parts per 100 parts by weight of rubber (hereinafter referred to as phr). Preferably, the level of platy filler in the rubber compound ranges from about 30 to about 75 phr.

The various rubber compositions may be compounded with conventional rubber compounding ingredients. Conventional ingredients commonly used include carbon black, tackifier resins, processing aids, antioxidants, antiozonants, stearic acid, activators, waxes, oils, sulfur vulcanizing agents and peptizing agents. As known to those skilled in the art, depending on the desired degree of abrasion resistance, certain additives mentioned above are commonly used in conventional amounts. Typical additions of carbon black comprise from about 10 to 150 parts by weight of rubber, preferably 50 to 100 phr. Typical amounts of tackifier resins comprise from about 2 to 10 phr. Typical amounts of processing aids comprise 1 to 5 phr. Typical amounts of antioxidants comprise 1 to 10 phr. Typical amounts of antiozonants comprise 1 to 10 phr. Typical amounts of stearic acid comprise 0.50 to about 3 phr. Typical amounts of zinc oxide comprise 1 to 5 phr. Typical amounts of waxes comprise 1 to 5 phr. Typical amounts of oils comprise 2 to 30 phr. Typical sulfur vulcanizing agents include elemental sulfur, amine disulfides, polymeric polysulfides, sulfur olefin adducts and mixtures thereof which are used in an amount ranging from about 0.2 to 8 phr. Typical amounts of peptizers comprise from about 0.1 to 1 phr. The presence of relative amounts of the above additives are not considered an aspect of the present invention.

In accordance with a preferred embodiment, co-acting curatives are separated in adjacent parallel layers. For example, when the layers are prepared, they are often heated to facilitate flow and heat may also be generated by mechanical working of the rubber. For rubbers that contain curatives, the heat associated with such processing may induce cure or at least begin the process. To alleviate such possibilities, it is preferred to separate co-acting curatives in adjacent parallel layers. For example, sulfur may be compounded in layer A and no accelerators; however, layer B, which is parallel to A, will contain accelerators but no sulfur. Layer A will follow. Upon cure temperature, the sulfurs and accelerators will migrate into adjacent layers and the article of the present invention becomes readily curable. Other curatives may also be separated, such as zinc oxide or zinc stearate in one layer and the sulfur and accelerator in the next layer.

This can be appreciated after having read the present application, one skilled in the art can appreciate the various methods by which the claimed rubber articles may be formed. For example, the various layers may be placed within a mold in a manner so as the orientation of the layers are in accordance with the present invention.

One critical aspect of the present invention is that the layers have the desired thickness. One method in which the desired thicknesses can be prepared is the use of a multilayer of extruder and die. The layers may be formed in a number of ways. For example, one method involves use of two separate extruders which feed two generally, but not necessarily, different rubber compounds to a convergence point where the two feeds are brought together to create a bi-layer. This bi-layer then is fed through a series of dies, each of which doubles the number of layers in the extrudate. Thus, the original two component (AB) layer becomes four layers (ABAB) after passing through the first die element and eight layers (ABABABAB) after passing through the second die element. FIG. 2 illustrates the principle of the layering dies.

Another method of co-extruding multilayer laminates is described in U.S. Pat. No. 3,557,165.

Although extruders are a preferred means of preparing composites with large numbers of very thin layers (e.g. more than 10,000 layers/25.4 mm), other less elaborate means of preparing thin multilayers are also possible. A calender can be used to prepare thin sheets of polymeric material which can subsequently be plied up in alternating layers and possibly further thinned by application of pressure. By repeated plying and thinning, composites with several hundred layers per inch can be readily prepared.

EXAMPLE 1

Molded rubber blocks were prepared having a surface area of a series of rubber layers parallel to each other and in a density of about 11,000 layers per 25.4 millimeters as measured in a perpendicular direction to the layers along the surface area. The layered blocks were prepared in accordance with the process shown in FIG. 2. The multilayer extruder consisted of two, separate, 19 mm (diameter) 24/1 L/D high-temperature plastics extruders purchased from The Killion Co., Cedar Grove, N.J. The extruders fed two compounds to a convergence point where the two feeds are brought together to create a bi-layer. The bi-layer was fed through a series of dies which were obtained from DSM (Dutch School Mines/Technical University Eindhoven, Netherlands. Each die doubles the number of layers in the extrudate. Thus, the original two layers become four layers after passing through the first die element and eight layers after passing through the second die element. Seven die elements were used to form 256 layer composites (11,000 layers per 25.4 mm).

The first rubber article (Sample 1), according to the present invention, had alternating layers of two different rubber compounds. The first rubber compound contained 43 parts by weight of polybutadiene, 4 parts by weight of natural rubber, 96.25 parts by weight of oil extended SBR (PLF 1712C), 95 parts by weight of carbon black and conventional amounts of stearic acid, waxes, processing oil, antidegradants, primary and secondary accelerators, zinc oxide and sulfur. The second rubber compound contained 100 parts by weight of NBR (Chemigum® N300), 50 phr of talc and conventional amounts of antidegradants, stearic acid, zinc oxide, accelerators and sulfur.

For control purposes, a molded non-layered rubber block (Sample 3) was prepared containing a 50/50 blend of the above polybutadiene containing compound and NBR containing compound.

In addition, a molded non-layered rubber block (Sample 4) was prepared containing only the polybutadiene rubber compound and a molded non-layered rubber block (Sample 5) containing only the NBR compound was prepared.

Din abrasion tests (both at room temperature and hot), according to ASTM Test Method ISO 4649-1895 (E), were conducted on the samples.

Sample 1 was tested when the abrasion was in the direction against the layers edges.

Sample 2 (Control) was tested where the abrasion was planar to the surface; i.e., only one layer covered the entire side of the sample when abrasion was tested.

Sample 3 (Control) was the non-layered blend of the two rubber compounds.

Sample 4 (Control) was the non-layered polybutadiene natural rubber, SBR rubber compound.

Sample 5 (Control) was the non-layered NBR rubber compound.

Table I below lists the respective DIN abrasion values for Samples 1–5.

TABLE I

| | Sample 1 | Control Sample 2 | Control Sample 3 | Control Sample 4 | Control Sample 5 |
|---|---|---|---|---|---|
| Hot Din Abrasion | 97 | 937 | 286 | 174 | 135 |
| RT DIN Abrasion | 84 | 940 | 316 | 160 | 125 |

Since these tests measure weight loss, the lower the values, the better the abrasion resistance. As can be seen, abrasion values varied drastically with orientation of the layers.

What is claimed is:

1. A rubber article having a surface construction designed for abrasion resistance, said surface area comprising a series of rubber layers parallel to each other and in a density of from at least 200 layers per 25.4 millimeters as measured in a perpendicular direction to the layers along said surface area of the article.

2. The rubber article of claim 1 wherein said density ranges from about 200 to about 20,000 per 25.4 millimeters.

3. The rubber article of claim 1 wherein alternating layers along the surface area are comprised of a different rubber composition than the layers interspersed therein.

4. The rubber article of claim 3 wherein the alternating layers contain sulfur and no accelerators and the layers interspersed therein contained accelerators and no sulfur.

5. The rubber article of claim 1 wherein each rubber layer is of the same thickness as measured in the perpendicular direction.

6. The rubber article of claim 1 wherein alternating layers along the surface area are of a different thickness as measured in the perpendicular direction.

7. The rubber article of claim 1 wherein each layer has a thickness ranging from about 0.001 to about 0.15 millimeters.

8. The rubber article of claim 1 wherein said rubber layers are oriented to the surface area of the article in a direction that is perpendicular to the plane at which the abrasion resistance is designed.

9. The rubber article of claim 1 wherein said article is in the form of a tread of a tire, shoe soles, railroad crossings, tank tread pads, seals, belt or hose.

10. The rubber article of claim 9 wherein said rubber compound contains from about 25 to 150 phr of a platy filler selected from the group consisting of talc, clay, mica and mixtures thereof.

11. The rubber article of claim 10 wherein said rubber compound contains from about 30 to 75 phr of a platy filler.

12. The rubber article of claim 9 wherein said article is in the form of a tread of a tire and said alternating layers along the surface area are comprised of a different rubber composition than the layers interspersed therein.

13. The rubber article of claim 1 wherein said rubber layers are comprised of a rubber compound which contains a rubber selected from a group consisting of acrylonitrile-diene copolymers, natural rubber, halogenated butyl rubber, butyl rubber, cis-1,4-polyisoprene, styrene-butadiene copolymers, cis-1,4-butadiene, styrene-isoprene-butadiene terpolymers and mixtures thereof.

* * * * *